Dec. 30, 1969  J. CERMAN ET AL  3,486,573
DOSING APPARATUS FOR SHREDDED TOBACCO
Filed March 5, 1968  5 Sheets-Sheet 4
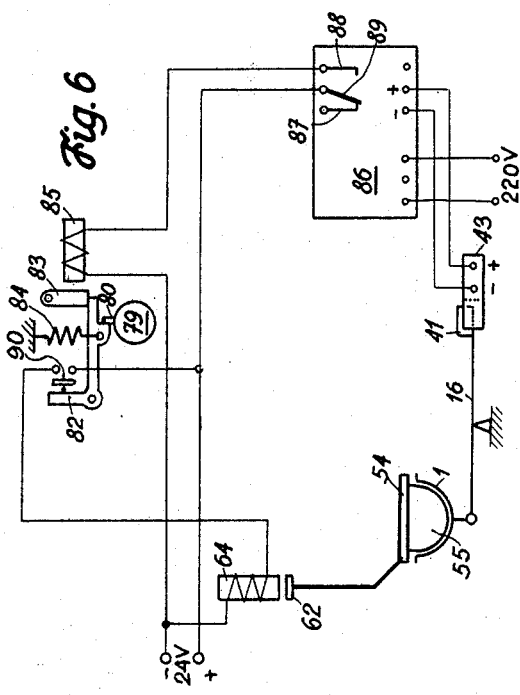
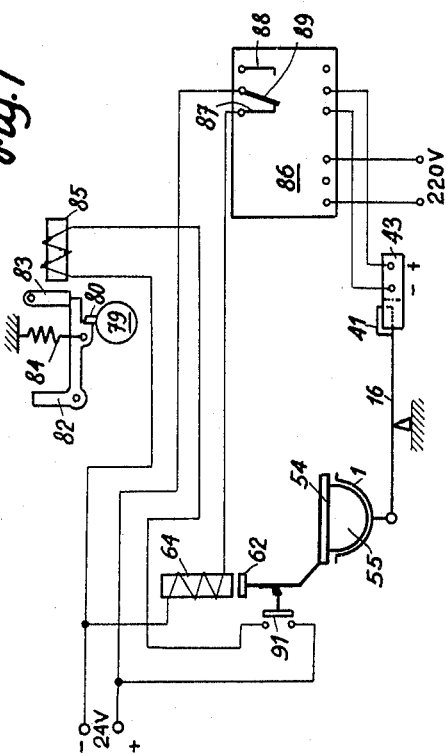
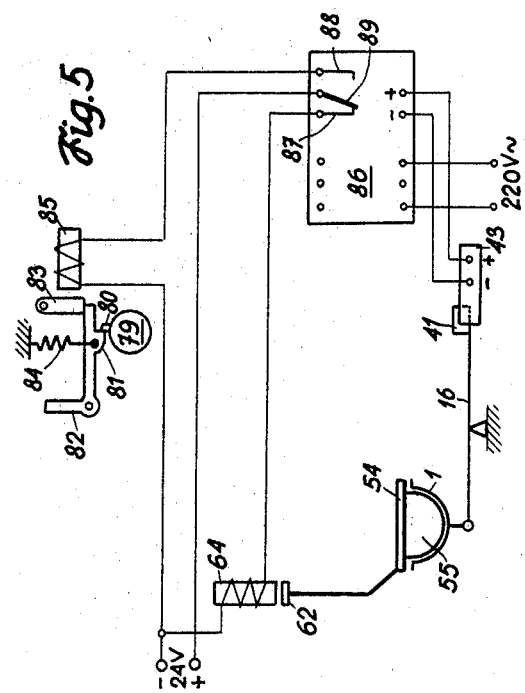
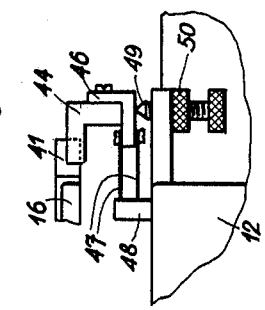
Josef Cerman
Zdeněk Louda
Ladislav Nepožitek
František Žák
INVENTORS
By Richard Low
Agt Dec. 30, 1969 J. CERMAN ET AL 3,486,573
DOSING APPARATUS FOR SHREDDED TOBACCO
Filed March 5, 1968 5 Sheets-Sheet 5

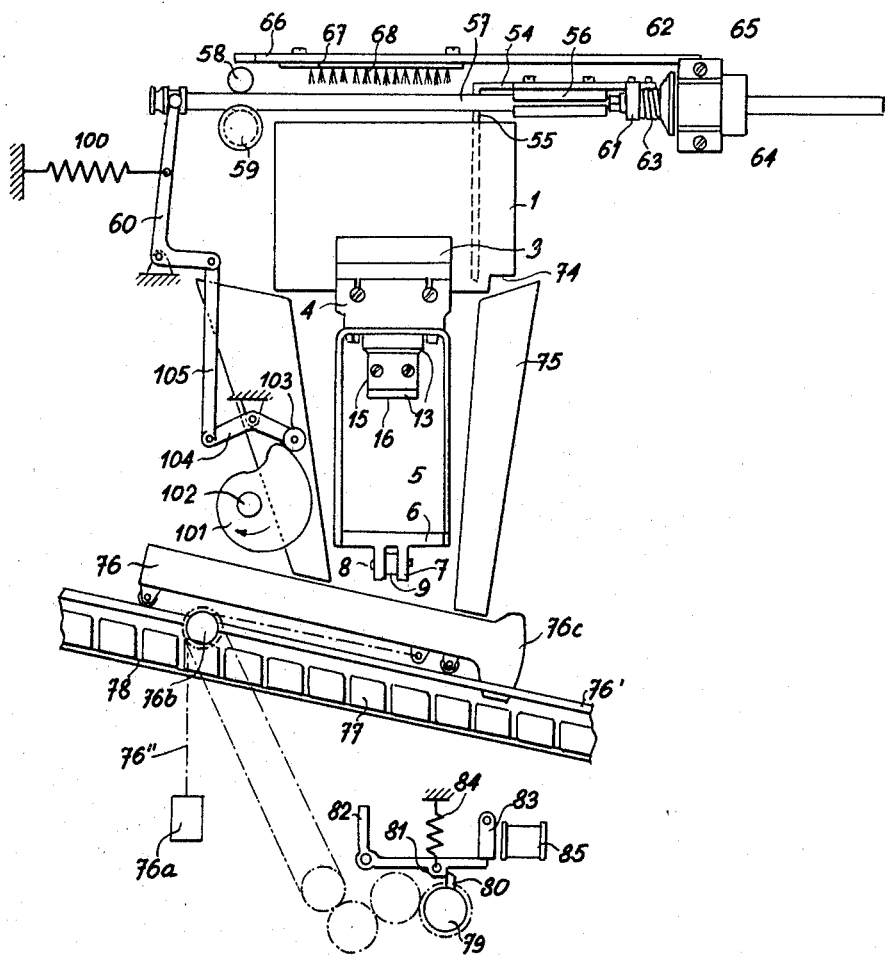

Josef Cerman
Zdeněk Louda
Ladislav Nepožitek
František Žák
INVENTORS

United States Patent Office 3,486,573
Patented Dec. 30, 1969

3,486,573
DOSING APPARATUS FOR SHREDDED TOBACCO
Josef Cerman, Prague, Zdeněk Louda, Dobris, Ladislav Nepožitek, Prague, and Erantisek Žák, Kysice u Plzen, Czechoslovakia, assignors to Skoda, oborovy podnik, Plzen, Czechoslovakia
Filed Mar. 5, 1968, Ser. No. 710,584
Claims priority, application Czechoslovakia, Mar. 7, 1967, 1,645/67
Int. Cl. G01g 13/02, 13/30
U.S. Cl. 177—74                6 Claims

ABSTRACT OF THE DISCLOSURE

An automatic dosing apparatus for shredded tobacco and similar fibrous material in which the tobacco is dropped from a receptacle on a weighing pan of a balance until a shutter closes the receptacle. The mechanism for operating the shutter is controlled by a blade on the balance beam which moves away from a proximity responsive pick-up as soon as the balance pan outweighs a counterweight on the beam. An electrical signal from the pick-up controls movement of the shutter.

BACKGROUND OF THE INVENTION

This invention relates to automatic apparatus for dosing shredded tobacco and similar fibrous material by weight.

More specifically, the invention will be described hereinafter with reference to the delivery of precisely weighed batches of pipe tobacco to a packing machine. Shredded tobacco cannot be divided into batches of equal weight by masuring volume because the bulk density of such fibrous material varies greatly not only with the fiber length and shape and with other inherent properties of the material, but also with the past processing of the fibers and with environmental factors.

It is still quite common to weigh tobacco batches by hand prior to packaging, and the automatic equipment available heretofore for dosing tobacco according to weight has neither the accuracy nor the long service life which are required in an industry handling large amounts of material in numerous small weight units.

The object of the invention is the provision of dosing equipment for shredded tobacco which is simple and sturdy so as to have a long useful life, yet is capable of delivering small batches of shredded tobacco of precisely uniform, predictable weight.

SUMMARY OF THE INVENTION

The invention, in one of its aspects, is concerned with improvements in dosing apparatus having a balance beam carrying a weighing pan and a counterweight at opposite sides of a pivot, and having a receptacle arranged above the pan and equipped with a shutter movable for opening and closing a downwardly directed opening of the receptacle. The invention provides a metallic blade on the beam for movement therewith and an abutment which holds the blade in a predetermined position as long as the counterweight outweighs the pan and the contents thereof.

When the pan and its contents outweigh the counterweight, the blade member moves away from the aforementioned position. A pick-up arrangement which is spaced from the blade member in all its operative positions, and is sensitive to the proximity of the blade member, generates an electrical signal in response to movement of the blade member away from its predetermined position. An actuating mechanism responds to the signal for moving the shutter from a receptacle opening to a receptacle closing position.

Other features, additional objects, and many of the attendant advantages of this invention will readily be appreciated as the same becomes better understood by reference to the following detailed description of a preferred embodiment of the dosing apparatus of the invention and of various electrical control circuits for operating the same.

BRIEF DESCRIPTION OF THE DRAWINGS

In the drawings:
FIG. 3 is a front elevational view of the same apparatus;
FIG. 4 shows a modified detail for the apparatus of FIG. 1 in a corresponding view;
FIGS. 5 to 7 diagrammatically illustrate a control circuit for the apparatus of FIGS. 1 to 3 in three alternative modifications.

DESCRIPTION OF THE PREFERRED EMBODIMENTS

Figure 1:
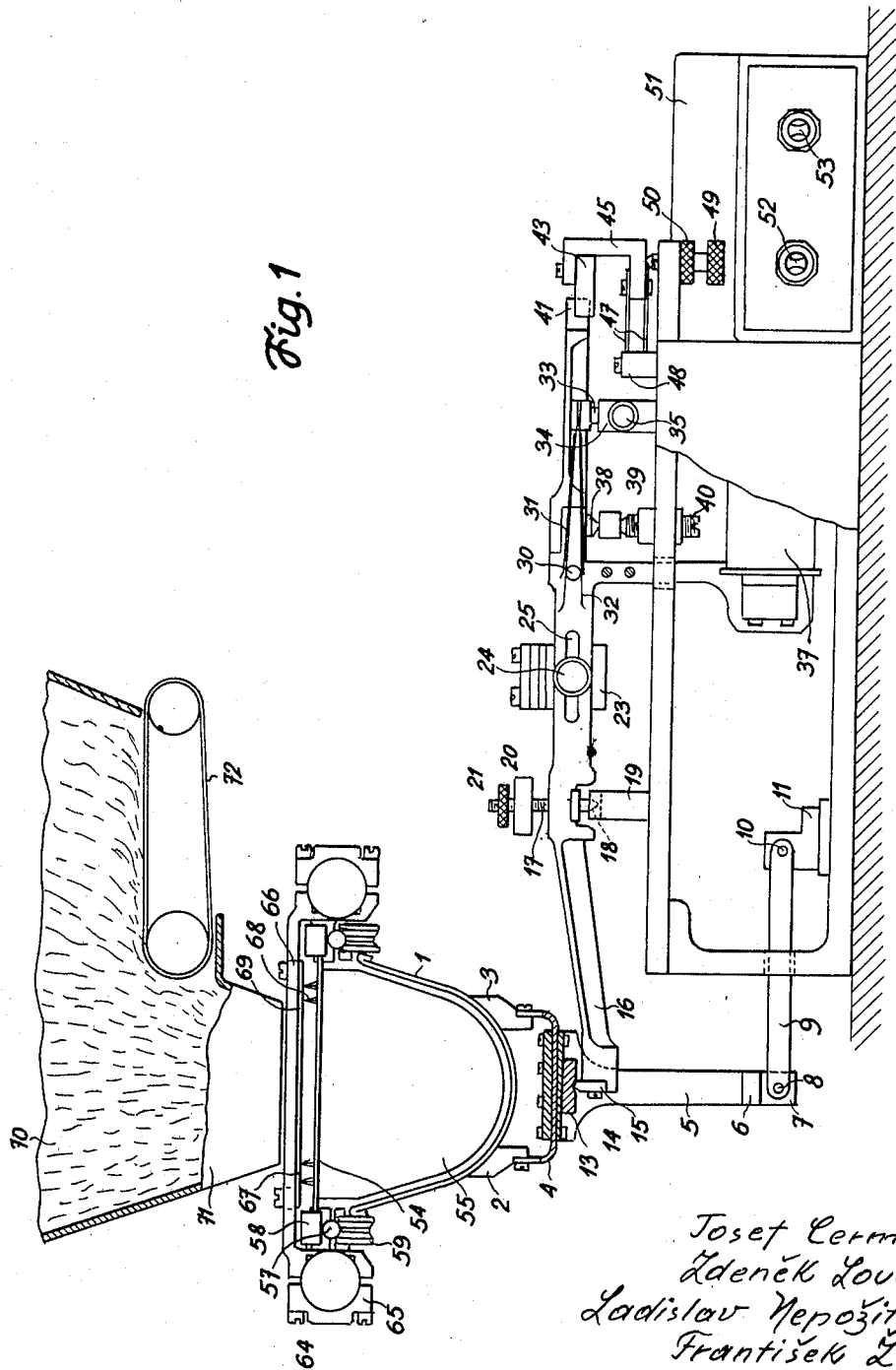
FIG. 1 shows a tobacco dosing apparatus of the invention in side elevation, and partly in section.
Figure 2:
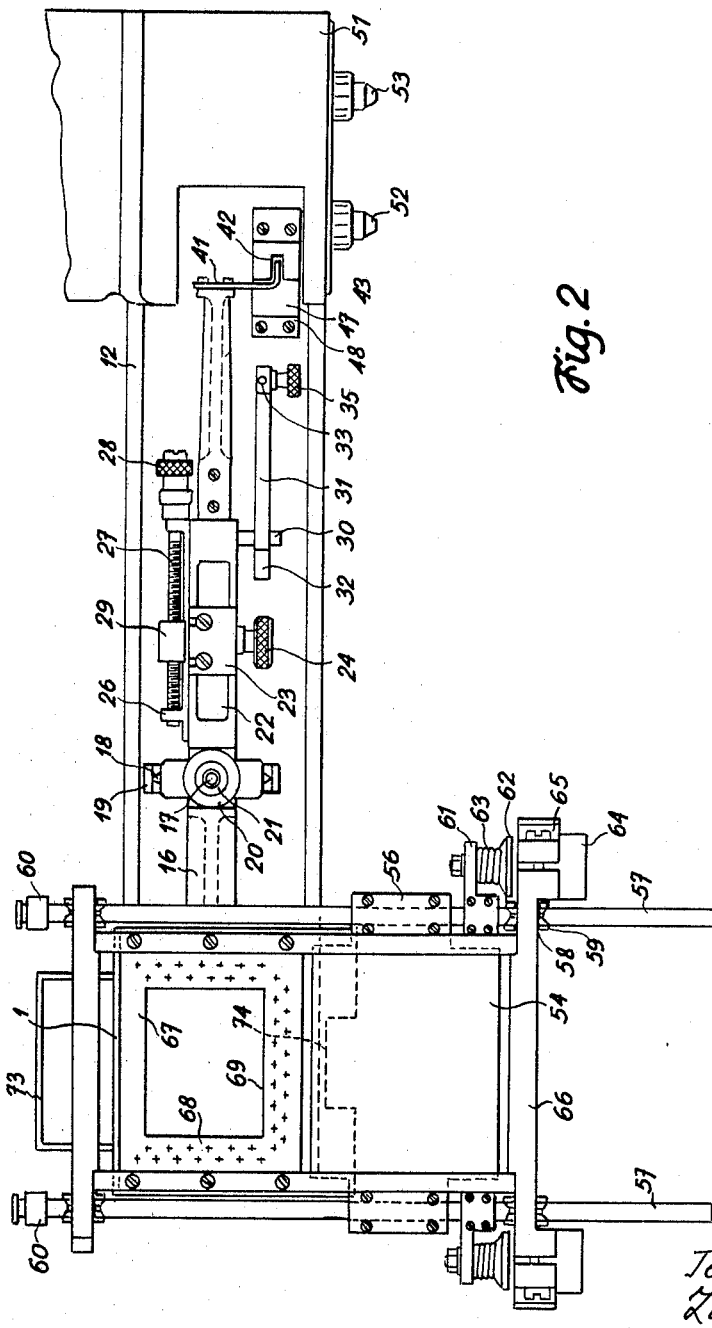
FIG. 2 illustrates the apparatus of FIG. 1 in top plan view.

Referring now to the drawings in detail, and initially to FIGS. 1 to 3, there is shown a weighing pan 1 open in one horizontal direction and fixedly fastened by lugs 2, 3 to a U-shaped bracket 4 which in turn is attached to a frame 5 having the shape of an inverted U. A cross bar 6 between the free ends of the frame 5 carries two bosses 7 connected by a pivot pin 8 to each other and to an end of a guide arm 9 whose other end is attached by a pin 10 to a column 11 in a balance base or casing 12.

A bearing plate 13 is mounted on the underside of the bracket 4 and has a downwardly open groove of V-shaped cross section in which a knife edge 15 is pivotally received. The knife edge 15 is mounted at the end of one arm of a balance beam 16. The beam is pivotally supported on a knife edge 18 engaging a bearing block 19 on the casing 12. A threaded spindle 17 vertically aligned with the knife edge 18 extends upward from the beam 16 and is threadedly engaged by a regulating weight 20 whose position on the spindle 17 may be secured by a locking nut 21.

The other arm of the beam 16 has a wide elongated slot 22 which is open in both vertical directions, as best seen in FIG. 2, and receives a principal counterweight 23. A clamping screw 24 passes through a horizontal slot 25 in the beam 16, and its end is threadedly received in the counterweight 23. The head of the screw 24 may be clamped against the beam 16 to arrest the counterweight 23 in a desired position longitudinally of the beam 16.

Two brackets 26 on the vertical wall of the beam remote from the screw 24 axially secure a threaded spindle 27 having a slotted head for engagement with a screwdriver and equipped with a lock nut 28. The spindle 27 threadedly carries an auxiliary counterweight 29 which may be adjusted toward and away from the knife edge 18 by turning the spindle 27, rotation of the auxiliary weight being prevented by engagement with the beam 16.

A laterally projecting stud 30 on the other arm of the beam 16 is biased toward the position shown in FIG. 1 by two leaf springs 31, 32 which abut against the stud 30 from above and from below respectively and are adjustably attached to the casing 12 by an upright bar 33 vertically slidable in a tubular socket 4 and held in position by a set screw 35. They damp oscillation of the beam 16.

An aluminum blade 36 depends from the balance beam near the stud 30 into the casing 12 and between the pole pieces of an electromagnet 37 for damping oscillations of the beam 16 in a conventional manner. A rounded abutment 38 on the underside of the beam 16 engages an abutment plate 39 to limit the oscillation of the beam 16, the height of the plate 39 being adjustable by means of a screw 40.

A blade 41 of ferrous metal on the end of the beam 16 remote from the pan 1 moves into and out of the air gap 42 in the magnetic circuit of a non-illustrated coil in the oscillator circuit of an electronic switch 43. The change in the inductance of the coil as the blade 41 moves into and out of the gap 42 operates the switch in a conventional manner.

The switch 43 is attached to a bracket 45 which is secured to a post 48 on the casing 12 by two leaf springs 47 which permit the level of the switch 43 to be adjusted vertically by means of a screw 49 threadedly movable in the casing 12 about a vertical axis in abutting engagement with the bracket 45 and arrested in the desired position by a locking nut 50. The electrical power controls of the apparatus are mainly located in a housing 51 adjacent the balance casing 12, and two switch knobs 52, 53 are arranged on the outer wall of the casing 51. Their function will become apparent presently.

A shutter plate 54 is mounted above the pan 1 for horizontal movement and is fixedly fastened to a pusher plate 55 depending into the pan 1. The shutter plate 54 is provided with lateral clamping lugs 56 fastened to horizontal rods 57 on either side of the plate 54. The rods are guided longitudinally between rollers 58, 59 and are operated by the continuously rotating main drive shaft of the apparatus as is best seen in FIG. 3.

Bellcrank levers 60 of which only one is seen in FIG. 3 engage the ends of the rods 57 remote from the plate 54 and are each biased by a helical tension spring 100 to move the plate 54 to the left, as viewed in FIG. 3. A clutch of a type described hereinbelow is interposed between the main drive shaft and a shaft 12 to turn the shaft 102 clockwise through one turn from time to time. The shaft 102 carries a radial cam 101 whose spiraling peripheral camming edge is engaged by a cam follower 103 on a rocker 104. The rocker is connected to the lever 60 by a link 105. When the cam 101 is turned beyond the illustrated position by the shaft 102, the spring 100 can pull the plates 54, 55 to the left.

Brackets 61 on the rods 57, best seen in FIG. 2, carry on bumper springs 63 armatures 62 for electromagnets 64. The electromagnets 64 are attached to a member 66 of the stationary machine structure by clamps 65. When energized, as will be described hereinafter, the magnets 64 hold the plates 54, 55 in the position shown in FIGS. 2 and 3 in which the pan 1 is upwardly open.

The stationary member 66 also carries a flat horizontal plate 67 which has a large central opening 69 and whose underside is studded with small brushes 68 which extend into the path of the shutter plate 54.

As is shown only in FIG. 1, but has been omitted from FIGS. 2 and 3 for the sake of clarity, the bottom end of a hopper 71 rests on the plate 67 and is supplied with shredded tobacco 70 by a belt conveyor 72. As long as the shutter plate 54 is in the position shown in FIGS. 2 and 3, tobacco falls freely into the pan 1 from the hopper 71 through the rectangular central opening 69 in the plate 67. When the rods 57 are released by the electromagnets 65 and the cam 101, the shutter plate 54 obstructs the opening 69, and the tobacco is swept from the pan 1 by the pusher plate 55. When the shutter plate is again retracted to the illustrated position by the cam 101, the brushes 68 sweep the tobacco particles from the top surface of the shutter plate into the pan 1.

The tobacco is moved from the pan 1 through the open end of the same by the pusher plate 55 into a chute 73 during the closing stroke of the shutter plate 54, and residual tobacco is wiped from the pan 1 into another chute 75 arranged under an opening 74 in a terminal wall of the pan remote from the open end. Both chutes 73, 75 lead downward toward a known conveying device, described in more detail in British patent specification No. 797,216.

The device includes an upwardly open feeder trough 76 mounted on obliquely inclined guide rails 76' and operated by gravity and by a chain 76'' from which a counterweight 76a is suspended. The chain is trained over a sprocket 76b which is rotated from time to time to pull the trough 76 up the inclined guide rails 76'. The lower end of the trough 76 constitutes a delivery chute 76c from which the contents of the trough are released to buckets or containers 77 on an endless conveyor chain or belt 78 whose illustrated upper strand is parallel to the guide rails 76' and moves obliquely upward under the rails. The return strand of the conveyor and its drive have been omitted from the showing of FIG. 3. The conveyor 77, 78 leads to a packing machine, not itself shown since it may be entirely conventional.

The drive train for the sprocket 76b includes a one-revolution clutch 79, more fully described in the aforementioned British patent specification, in which motion transmission from a drive shaft to the sprocket 76b is interrupted when a rotating abutment 80 engages a detent 81 on one arm of an angle lever 82, the arm being held against the armature 83 of an electromagnet 85 by a helical tension spring 84 when the magnet is not energized.

Electrical circuits for the apparatus shown in FIGS. 1 to 3 are diagrammatically illustrated in FIGS. 5 to 7. The electronic switch 43 controls a relay 86 whose movable contact 89 is spring-biased toward a fixed contact 87 in a non-illustrated, conventional manner to pass direct current from a 24-volt line through the magnets 64, of which only one is indicated in FIG. 5, and thereby to keep the shutter plate 54 in the retracted position shown in FIGS. 2 and 3.

When the pan 1 contains a weight of tobacco for which the counterweights 23, 29 are set, the blade 41 moves out of the gap 42, and the increased output of the switch 43 causes the relay 86 to open the circuit of the magnets 64 between the contacts 87, 89, and to close the energizing circuit of the magnet 85 between the movable contact 89 and a fixed contact 88, thereby releasing the drive train of the sprocket 76b.

Another one-revolution clutch, not shown, but identical with the clutch 79 and in circuit with the contact 88 simultaneously causes the shaft 102 to rotate, thereby permitting the spring 100 to move the shutter plate 54 and the pusher plate 55 toward the left, as viewed in FIG. 3. The weighed amount of tobacco is dropped into the trough 76 and transferred to the conveyor 76, 77 for transfer to the packing machine.

The velocity at which the blade 41 moves out of the gap 42 when the tobacco in the pan 1 overbalances the counterweights 23, 29 can be adjusted by setting the level of the regulating weight 20 above the knife edge 18. Oscillation of the balance beam is prevented by the springs 31, 32 and by the damper blade 36 in the magnetic field of the electromagnet 37. The energizing circuit of the magnet is controlled by the switch 53, and switch 52 controlling the main power supply to the several conveyors, drive motors, and other power consuming elements of the apparatus, not all such drive motors and elements being explicitly shown and described.

The counterweights 23, 29 must be set for a somewhat lower weight of tobacco than it is desired to transfer to the trough 76 in each cycle, some tobacco being dropped into the pan 1 after movement of the shutter plate 54 is initiated. The amount of tobacco fed to the pan 1 after the shutter plate 54 starts moving depends on the properties of the tobacco, particularly its fiber size, and adjustments are readily made by trial and error. For long-fibered tobacco, as much as 4%, for short-fibered tobacco approximately 2% of the total batch may enter the pan after it reaches its equilibrium weight.

When the pan 1 has been substantially emptied by the pusher plate 1, the beam 16 returns to the position shown in FIG. 1, the blade 41 enters the gap 42, and the output of the switch 43 drops so that the contact 89 returns to the position shown in FIG. 5. Simultaneously, the plates 54, 55 are retracted by the cam 101 on the rotating shaft 102 before the cam is again stopped in the position illustrated, and the trough 76, having distributed its contents over the several buckets 77 on the conveyor chain 78 is returned to the position shown in FIG. 3. During the return movement of the plates 54, 55, tobacco from the top surface of the shutter plate 54 is wiped into the opening 69 of the stationary plate 67 by the brushes 68, and residual tobacco on the pan 1 is wiped by the pusher plate 55 through the opening 74 into the chute 75.

A damper in the relay 86 retards the movement of the contact 89 so that the one-revolution clutch 79 starts moving the trough 76 and the non-illustrated one-revolution clutch starts turning the cam 101 with some delay after the magnet 64 has been demagnetized. An additional delay mechanism may be provided in a conventional manner to retard operation of the clutch 79 relative to the non-illustrated clutch which operates the plates 54, 55.

The apparatus illustrated in FIGS. 1 to 3 and 5 delivers precisely uniform weights of shredded tobacco if the tobacco is of reasonably uniform quality. The apparatus is readily adjusted for differences in tobacco properties as has been set forth hereinabove and will be discussed in more detail hereinafter.

In the modified control circuit shown in FIG. 6, the fixed contact 87 is not connected, and the relay 86 operates a normally open single-pole, single-throw switch in the energizing circuit of the magnet 85. The coil 64 is energized through a normally open limit switch 90 operated by one arm of the angle lever 82 when the arm is blocked in the illustrated position by the armature of the magnet 85.

In the circuit shown in FIG. 7, the fixed contact 88 is not connected, and the relay 86 operates a normally closed SPST switch in the energizing circuit of the magnet 64. A normally closed limit switch 91 in the energizing circuit of the magnet 85 is mechanically linked to the armature 62 to keep the magnet 85 deenergized as long as the magnet 64 attracts its armature 62.

The timing of the clutch 79 relative to the release of the pusher plate 54 is somewhat altered by the modified circuits of FIGS. 6 and 7, but the basic operation is not affected. The choice between the circuits of FIGS. 5 to 7 is controlled by design considerations.

Figure 8:
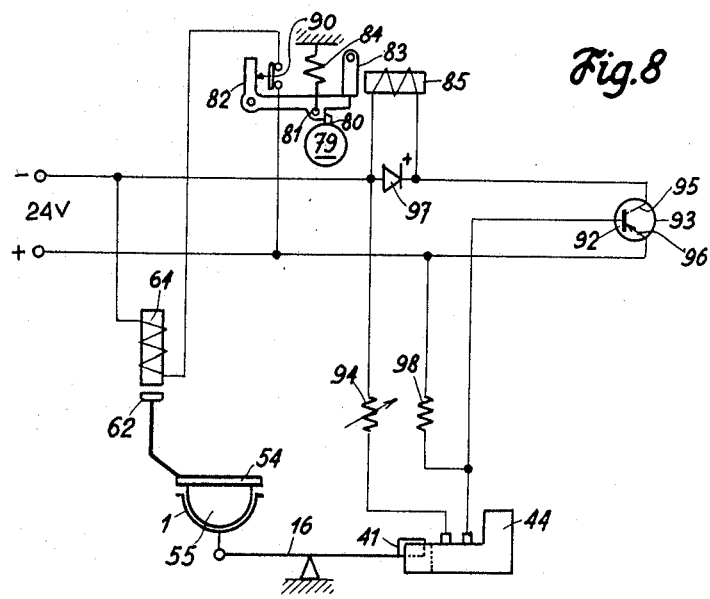
FIGS. 8 and 9 show two modifications of yet another control circuit in the manner of FIGS. 5 to 7.
Figure 9:
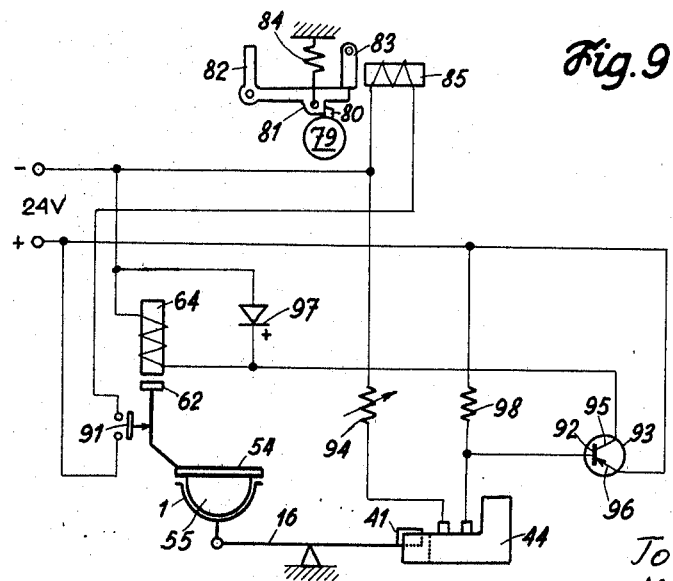

The use of a relay operating a mechanical switch is avoided with the modified electronic switch arrangement illustrated in FIG. 4 in conjunction with the circuit diagrams of FIG. 8 or 9. FIG. 4 shows the balance casing 12 on which a modified electronic switch 44 is mounted by means of a bracket 46 supported on a post 48 by means of leaf springs 47, and vertically adjusted by a screw 49 equipped with a locking nut 50. A blade 41 at the end of the balance beam 16 swings into and out of a gap in the magnetic circuit of an oscillator coil of the switch 44, as described above with reference to FIGS. 1 to 3. A transistor amplifier is built into the switch 44.

One output terminal of switch 44 is connected to the base of a power transistor, and the other terminal is connected to the negative pole of a low voltage direct current supply (24 volts) through an adjustable resistor 94. One terminal of the electromagnet 85 is connected to the same negative pole, and its other terminal to the collector 95 of the transistor 93 whose emitter 96 is connected to the positive pole of the power supply. A diode 97 is shunted across the terminals of the magnet 85 to avoid damage to the transistor 93 by the reactance peaks of the magnet 85. A resistor 98 connects the base 92 and the emitter 96 of the transistor 93 to stabilize the circuit.

The magnet 62 is controlled by a limit switch 90 held in the closed position by the lever 82 as long as the magnet 85 is deenergized as has been described with reference to FIG. 6, and the control circuit of FIG. 8 generally operates as that of FIG. 6.

The transistor 93 becomes conductive as soon as the blade 41 moves out of the gap in the switch 44, whereby the magnet 85 is energized to start the one-revolution clutch 79, and the magnet 64 is deenergized.

The circuit shown in FIG. 9 is analogous to that illustrated in FIG. 7, and differs from that seen in FIG. 8 by the winding of the magnet 64 being substituted in the collector circuit of the transistor 95 for the magnet 85, and the latter being controlled by a limit switch 91 mechanically linked with the armature 62 of the magnet 64.

It will be appreciated that a capacitance type pick-up may be substituted for the inductance pick-up constituted by each of the afore-described electronic switches 43, 44. It is a common feature of both types that they respond to the location or proximity of the blade 41 without requiring mechanical engagement or motion transmission between the blade 41 or any other portion of the balance beam 16 and the switch arrangement, and generate an electrical signal in response to the departure of the blade 41 from its position in the gap 42.

Obviously, many modifications and variations of the present invention are possible in the light of the above teachings.

We claim:
1. In an apparatus for dosing fibrous material such as shredded tobacco, having a balance beam carrying a weighing pan and a counterweight at opposite sides of a pivot, a receptacle above the pan, and shutter means movable for opening and closing a downwardly directed aperture of the receptacle, the improvement which comprises
   (a) a metallic blade member mounted on said beam for movement therewith;
   (b) abutment means holding said blade member in a predetermined position as long as the counterweight outweighs the pan and the contents thereof, said blade member moving away from said predetermined position when the pan and the contents thereof outweigh the counterweight;
   (c) pick-up means sensitive to the proximity of said blade member for generating an electrical signal in response to movement of the blade member away from said predetermined position, said pick-up means being spaced from said blade member in said predetermined position of the same and during said movement thereof; and
   (d) actuating means responsive to said electrical signal for moving said shutter means from a receptacle opening to a receptacle closing position.

2. In an apparatus as set forth in claim 1, damper means for damping oscillation of said beam about said pivot.

3. In an apparatus as set forth in claim 1, wherein said pan is open in a horizontal direction, said shutter means including a pusher member extending from said receptacle into said pan, the pusher member moving toward and away from the open side of said pan when said shutter means moves between said receptacle opening and said receptacle closing positions.

4. In an apparatus as set forth in claim 3, said pan being formed with a discharge opening spaced from said open side in the direction of movement of said pusher member, a conveyor arranged under said pan, and two chutes leading from said open side and from said discharge opening toward said conveyor.

5. In an apparatus as set forth in claim 1, electromagnetic means in circuit with said pick-up means for retaining said shutter means in said receptacle opening position in the absence of said signal.

6. In an apparatus as set forth in claim 1, said actuating means including electromagnetic means in circuit with said pick-up means for controlling movement of said shutter means.

References Cited

UNITED STATES PATENTS

| | | | |
|---|---|---|---|
| 1,260,556 | 3/1918 | Layman | 177—79 |
| 1,853,967 | 4/1932 | Eggert | 177—76 |
| 2,634,082 | 4/1953 | Knobel | 177—116 |

FOREIGN PATENTS

| | | |
|---|---|---|
| 19,925 | 1891 | Great Britain. |
| 639,461 | 6/1950 | Great Britain. |

ROBERT S. WARD, Jr., Primary Examiner

U.S. Cl. X.R.

177—76, 79, 116